(12) United States Patent
Hiroki

(10) Patent No.: US 11,500,600 B2
(45) Date of Patent: Nov. 15, 2022

(54) WIRELESS PRINTING SYSTEM, INFORMATION PROCESSING APPARATUS, PRINTING APPARATUS AND METHODS OF CONTROLLING SAME

(71) Applicant: CANON KABUSHIKI KAISHA, Tokyo (JP)

(72) Inventor: Shigeru Hiroki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/692,047

(22) Filed: Aug. 31, 2017

(65) Prior Publication Data

US 2018/0004470 A1    Jan. 4, 2018

Related U.S. Application Data

(63) Continuation of application No. 14/974,285, filed on Dec. 18, 2015, now Pat. No. 9,785,393, which is a (Continued)

(30) Foreign Application Priority Data

Apr. 3, 2008    (JP) .............. JP2008-097480

(51) Int. Cl.
*G06F 3/12*    (2006.01)
*H04N 1/00*    (2006.01)
*H04W 4/80*    (2018.01)

(52) U.S. Cl.
CPC .......... *G06F 3/1292* (2013.01); *G06F 3/1204* (2013.01); *G06F 3/1245* (2013.01); (Continued)

(58) Field of Classification Search
CPC .... G06F 3/1292; G06F 3/1293; G06F 3/1245; G06F 3/1204; G06F 3/1236; H04W 4/80; (Continued)

(56) References Cited

U.S. PATENT DOCUMENTS 6,233,058 B1 *    5/2001    Park ................... H04N 1/00278
                                                                358/1.15
6,249,226 B1 *    6/2001    Harrison .............. G06K 7/0008
                                                                340/10.6
(Continued)

FOREIGN PATENT DOCUMENTS

CN    1343063 A    4/2002
CN    1898911 A    1/2007
(Continued)

OTHER PUBLICATIONS

Japanese Office Action dated Sep. 19, 2014 in connection with Japanese Patent Application No. 2013-196068.
(Continued)

*Primary Examiner* — Kent Yip
(74) *Attorney, Agent, or Firm* — Venable LLP

(57) ABSTRACT

In a system in which communication between an information processing apparatus and a printing apparatus is possible, the information processing apparatus detects that communication with the printing apparatus has become possible and, in response to detection that such communication has become possible, generates print data based upon data that the information processing apparatus is displaying on a display unit connected to or built in the information processing apparatus, and transfers the generated print data to the printing apparatus. The printing apparatus prints the data received from the information processing apparatus.

8 Claims, 9 Drawing Sheets

Related U.S. Application Data continuation of application No. 12/863,236, filed as application No. PCT/JP2009/057026 on Mar. 31, 2009, now Pat. No. 9,250,844.

(52) U.S. Cl.
CPC ....... *G06F 3/1293* (2013.01); *H04N 1/00278* (2013.01); *H04N 1/00442* (2013.01); *H04W 4/80* (2018.02); *H04N 2201/0036* (2013.01); *H04N 2201/0041* (2013.01); *H04N 2201/0055* (2013.01)

(58) Field of Classification Search
CPC ........... H04N 1/00442; H04N 1/00278; H04N 2201/0041; H04N 2201/0036; H04N 2201/0055; H04N 2201/006; H04N 2201/0048; H04N 2201/0075; H04N 2201/0094
See application file for complete search history.

(56) References Cited

U.S. PATENT DOCUMENTS

| | | | |
|---|---|---|---|
| 7,190,471 B2 * | 3/2007 | Sandfort et al. | G06K 15/00 358/1.14 |
| 7,409,231 B2 | 8/2008 | Oba et al. | |
| 7,986,945 B2 | 7/2011 | Yuki et al. | |
| 8,160,562 B2 | 4/2012 | Yuki et al. | |
| 8,244,179 B2 | 8/2012 | Dua | |
| 8,366,000 B2 | 2/2013 | Jalkanen et al. | |
| 8,493,104 B2 | 7/2013 | Willey et al. | |
| 2001/0011308 A1 | 8/2001 | Clark et al. | |
| 2002/0071035 A1 | 6/2002 | Sobol | |
| 2002/0138671 A1 | 9/2002 | Struble | |
| 2005/0138172 A1 | 6/2005 | Cromer et al. | |
| 2005/0243362 A1 * | 11/2005 | Sakuda | H04N 1/32789 358/1.15 |
| 2006/0114486 A1 | 6/2006 | Park | |
| 2007/0067503 A1 | 3/2007 | Hiroki | |
| 2008/0030780 A1 | 2/2008 | Izawa | |
| 2008/0051032 A1 * | 2/2008 | Hashimoto | H04M 1/737 455/41.3 |
| 2009/0036056 A1 * | 2/2009 | Oshima | H04M 1/7253 455/41.3 |
| 2009/0052348 A1 * | 2/2009 | Kato | H04L 63/0492 370/254 |
| 2009/0103124 A1 * | 4/2009 | Kimura | G06F 3/1209 358/1.15 |

FOREIGN PATENT DOCUMENTS

| | | |
|---|---|---|
| EP | 1195711 A2 | 4/2002 |
| JP | H06-022065 A | 1/1994 |
| JP | H07-325680 A | 12/1995 |
| JP | 2001-238105 A | 8/2001 |
| JP | 2001-337808 A | 12/2001 |
| JP | 2002-125175 A | 4/2002 |
| JP | 2002-127558 A | 5/2002 |
| JP | 2002-234235 A | 8/2002 |
| JP | 2002-312149 A | 10/2002 |
| JP | 2003-021876 A | 1/2003 |
| JP | 2004-072128 A | 3/2004 |
| JP | 2004-221936 A | 8/2004 |
| JP | 2005-148978 A | 6/2005 |
| JP | 2005-222233 A | 8/2005 |
| JP | 2006-004413 A | 1/2006 |
| JP | 2006-148316 A | 6/2006 |
| JP | 2007-079639 A | 3/2007 |
| JP | 2007-079924 A | 3/2007 |
| JP | 2007-087308 A | 4/2007 |
| JP | 2007-226747 A | 9/2007 |
| WO | 2003/021876 A1 | 3/2003 |
| WO | 2004/095778 A | 11/2004 |
| WO | 2007/026938 A1 | 3/2007 |

OTHER PUBLICATIONS

"Printing PDF takes up too much time", [online], Feb. 16, 2007, URL, http://komaba.sodan.ecc.u-tokyo.acjp/2006/FAQ/printing_complex.pdf/.
Japanese Office Action dated Jul. 4, 2014.
"Total Beginners, Start Here! Personal Computer "first steps" Latest Adobe Reader & PDF Introduction", Nikkei PC Beginners vol. 10, Japan, Nikkei Business Publications Inc., Oct. 13, 2007, vol. 12, p. 70-77.
"Easily Find From Your Objective Word Reverse Lookup Dictionary 50", Nikkei PC21, vol. 8, Issue 7, Japan, Nikkei Business Publication Inc., Apr. 1, 2013, p. 22-25.
Japanese Office Action dated Jun. 8, 2013 with English translation.
Japanese Office Action dated Jun. 10, 2013 with English translation.
State Intellectual Property Office of the People's Republic of China, Office Action dated Sep. 26, 2012, in connection with Application No. 200980112413.6.
Counterpart Office Action, Japanese Patent Application No. 2015-107844, dated Aug. 29, 2016.
Japanese Office Action dated May 20, 2016 in related Japanese Patent Application No. 2015-107844.
Japanese Office Action dated Dec. 9, 2016 in related Japanese Patent Application No. 2015-107844.
Chinese Office Action dated Jul. 25, 2019, in related Chinese Patent Application No. 201610945317.1 (with English translation).

* cited by examiner

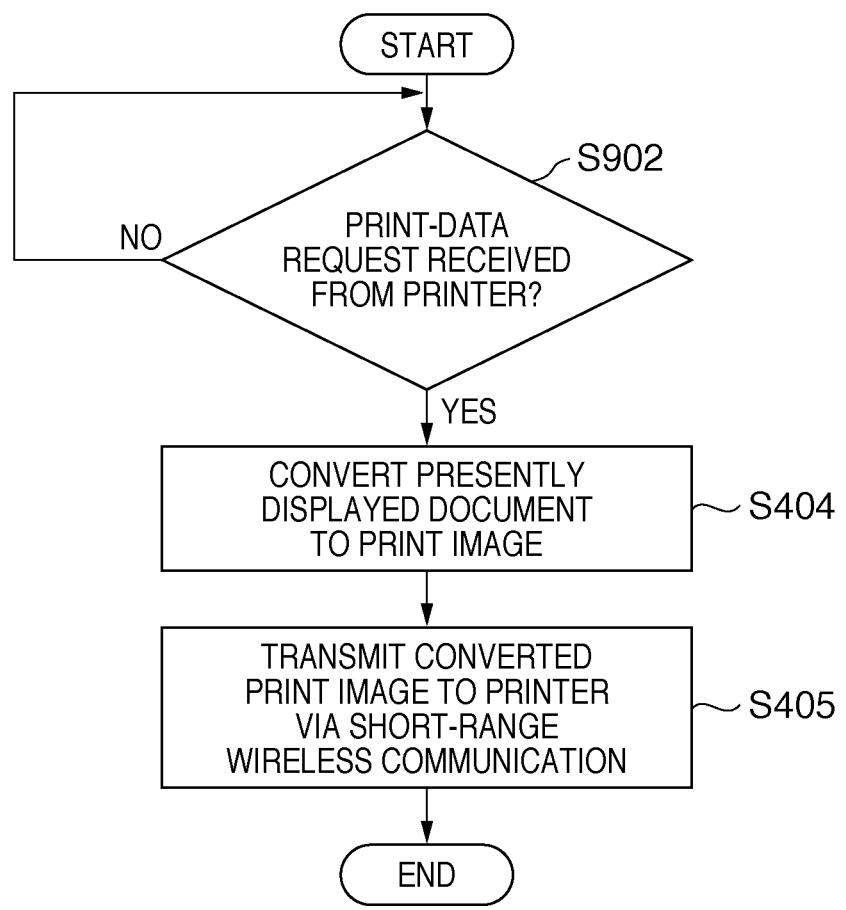

WIRELESS PRINTING SYSTEM, INFORMATION PROCESSING APPARATUS, PRINTING APPARATUS AND METHODS OF CONTROLLING SAME

This application is a continuation of application Ser. No. 14/974,285, filed Dec. 18, 2015, which is a continuation of application Ser. No. 12/836,236, filed Jul. 16, 2010, which is a continuation of a National Stage of International Patent Application No. PCT/JP2009/057026, filed Mar. 31, 2009.

TECHNICAL FIELD

The present invention relates to a wireless printing system for transferring print data from an information processing apparatus to a printing apparatus by wireless communication.

BACKGROUND ART

An information processing apparatus such as a personal computer generally has a display unit such as a monitor or is capable of being connected to one. Accordingly, an information processing apparatus is capable of displaying a document on the display unit and of editing the document. Examples of what can be edited by a personal computer include diagrams, tables and presentation data, etc., in addition to documents. In a case where editing or display of a document, diagram or image is performed by a personal computer, an application for document editing, rendering, spreadsheet, image editing or presentation is launched. With an ordinary personal computer, a plurality of documents can be edited and it is possible to display a plurality of documents on the display unit simultaneously. FIG. 5 illustrates a plurality of documents, a diagram, table and presentation being displayed on the display screen of a display unit possessed by a personal computer.

Generally, when printing is performed from a personal computer, first the personal computer and the printer are connected by a cable. Alternatively, the personal computer and printer are connected to the same network. By executing a print command from within an application that is displaying a document in a state in which a personal computer and printer are connected, the desired document is printed. By way of example, execution of the print command is achieved by clicking a print icon in a window that is displaying the document or by selecting printing from a pull-down menu.

The specifications of Japanese Patent Application Laid-Open Nos. 2001-238105 and 2002-125175 describe configurations in which a printer is used to print data from an apparatus other than a personal computer, such as a digital camera.

Japanese Patent Application Laid-Open No. 2001-238105 discloses a technique in which, by pressing the shutter-release button on a digital camera, an image from the digital camera is transferred to a personal computer and thence to a printer connected to the personal computer, whereby the image is printed by the printer.

Further, Japanese Patent Application Laid-Open No. 2002-125175 discloses a technique in which, if a digital camera and a printer have been connected, the digital camera receives and displays thumbnail data from the printer, selects an image from among the thumbnails and sends a print instruction to the printer, whereby the image is printed by the printer.

In the above-described examples of the prior art, however, some operation is necessary at the apparatus on the side that provides the print data. For example, in a case where an image possessed by a personal computer is printed, a print command in the application must be executed. Operation, therefore, is troublesome. In particular, in a case where a plurality of screens are being displayed on the display unit of the personal computer, the document to be printed must be selected and then printed. Such operation is even more troublesome.

Further, start of printing of a document being displayed by the personal computer cannot be designated from the printer side as by a print button. This is inconvenient in terms of operation. For example, in order to print a document that is being displayed by the personal computer, a print icon in the application is clicked. This is troublesome.

DISCLOSURE OF INVENTION

The present invention has been devised in view of the foregoing problems and seeks to make it possible to cause a printing apparatus to print, by a simple operation, a document possessed by an information processing apparatus.

According to one aspect of the present invention, there is provided an information processing apparatus comprising:
detection means for detecting that communication with a printing apparatus has become possible;
generation means, responsive to detection that communication with the printing apparatus has become possible, for generating print data based upon data that the information processing apparatus is displaying on a display unit connected to or built in the information processing apparatus; and
transfer means for transferring the print data, which has been generated by the generation means, to the printing apparatus.

Also, according to another aspect of the present invention, there is provided a printing apparatus comprising:
detection means for detecting that communication with an information processing apparatus, which has a display unit connected thereto or built in, has become possible;
instruction means for transmitting a print-data request to the information processing apparatus if it receives a print instruction operation while the detection means is detecting that communication with the information processing apparatus has become possible; and
printing means for receiving and printing print data generated by the information processing apparatus based upon data that is being displayed on the display unit when the information processing apparatus receives the print-data request.

Also, according to another aspect of the present invention, there is provided a method of controlling an information processing apparatus, comprising:
a detection step of detecting that communication with a printing apparatus has become possible;
in response to detection that communication with the printing apparatus has become possible, a generation step of generating print data based upon data that the information processing apparatus is displaying on a display unit connected to or built in the information processing apparatus; and
a transfer step of transferring the print data, which has been generated at the generation step, to the printing apparatus.

Also, according to another aspect of the present invention, there is provided a method of controlling a printing apparatus, comprising:

a detection step of detecting that communication with an information processing apparatus, which has a display unit connected thereto or built in, has become possible;

an instruction step of transmitting a print-data request to the information processing apparatus if a print instruction operation is received while it is being detected that communication with the information processing apparatus has become possible; and a printing step of receiving and printing print data generated by the information processing apparatus based upon data that is being displayed on the display unit when the information processing apparatus receives the print-data request.

Also, according to another aspect of the present invention, there is provided a system in which communication is possible between an information processing apparatus and a printing apparatus, wherein the information processing apparatus includes:

detection means for detecting that communication with a printing apparatus has become possible;

generation means, responsive to detection that communication with the printing apparatus has become possible, for generating print data based upon data that the information processing apparatus is displaying on a display unit connected to or built in the information processing apparatus; and transfer means for transferring the print data, which has been generated by the generation means, to the printing apparatus; and the printing apparatus includes:

printing means for printing data received from the information processing apparatus.

Furthermore, according to another aspect of the present invention, there is provided a system in which communication is possible between an information processing apparatus, which has a display unit connected thereto or built in, and a printing apparatus, wherein the printing apparatus includes:

detection means for detecting that communication with the information processing apparatus has become possible;

instruction means, responsive to detection by the detection means that communication with the information processing apparatus has become possible, for transmitting a print-data request to the information processing apparatus if a print instruction operation is received; and printing means for receiving print data, which conforms to the print-data request, from the information processing apparatus and printing the print data; and the information processing apparatus includes:

generation means for generating print data based upon data that the information processing apparatus is displaying on the display unit when the print-data request is received; and transfer means for transferring the print data, which has been generated by the generation means, to the printing apparatus.

Further features of the present invention will become apparent from the following description of exemplary embodiments with reference to the attached drawings.

BRIEF DESCRIPTION OF DRAWINGS

FIG. 9 is a flowchart illustrating operation of the personal computer 101 in the second embodiment.

BEST MODE FOR CARRYING OUT THE INVENTION

Embodiments of the present invention will now be described with reference to the accompanying drawings.

Figure 1:
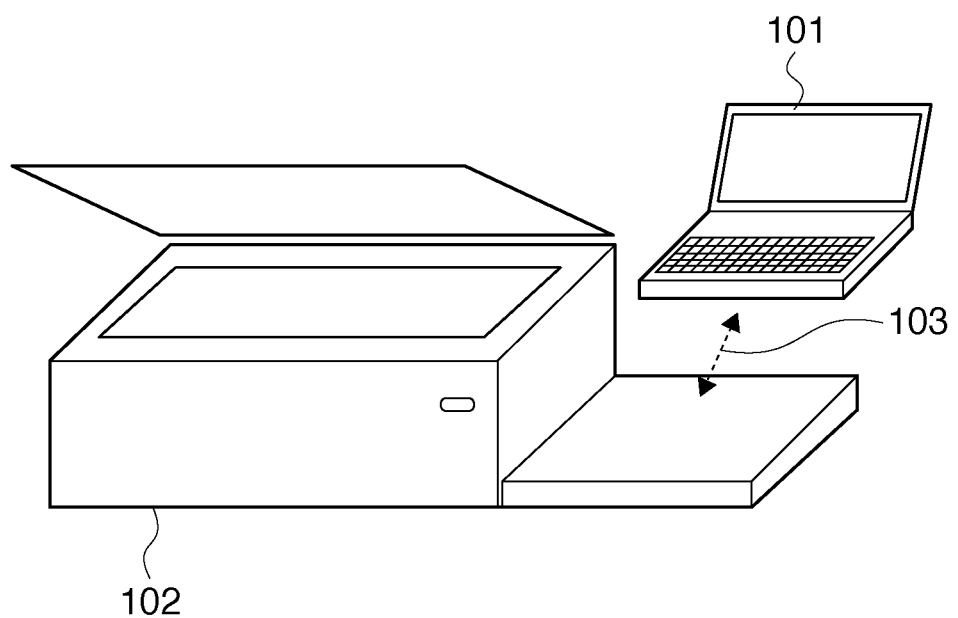
FIG. 1 is a diagram illustrating an example of the configuration of a printing system according to an embodiment.

FIG. 1 is a diagram illustrating an example of the configuration of a wireless printing system according to an embodiment of the present invention. The wireless printing system of this embodiment is constituted by a personal computer 101 serving as an information processing apparatus and a printer 102 serving as a printing apparatus, in which the personal computer 101 and printer 102 are connected by short-range wireless communication 103. Short-range wireless communication 103 includes contactless IC-card wireless communication utilizing electromagnetic induction, NFC (Near-Field Communication) and communication utilizing an induced electric field (i.e. TransferJet).

Figure 2:
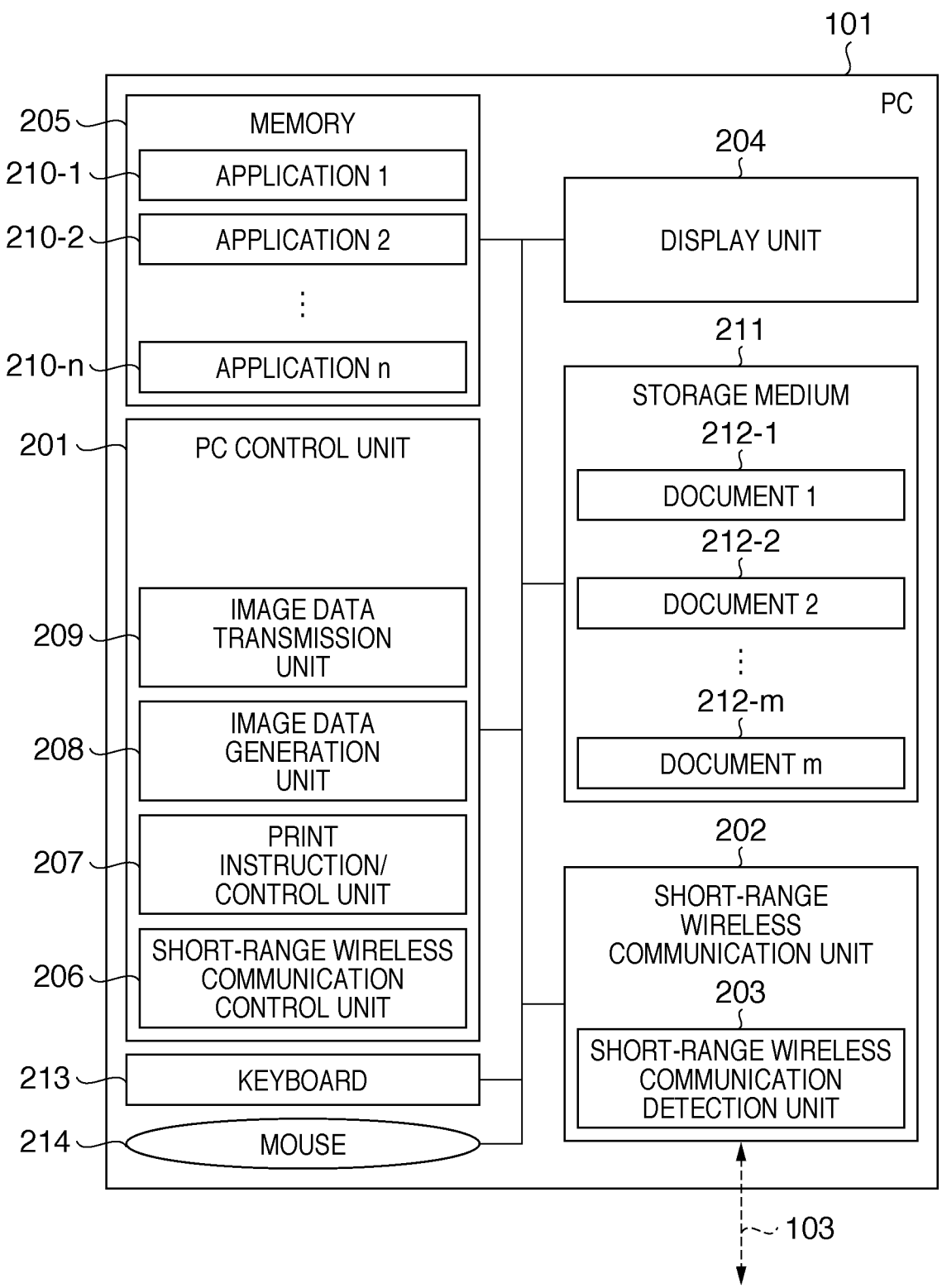
FIG. 2 is a block diagram illustrating an example of the configuration of a personal computer 101 according to a first embodiment.

FIG. 2 is a block diagram illustrating an example of the configuration of the personal computer 101 according to the first embodiment.

A PC (Personal Computer) control unit 201 controls the personal computer 101. The PC control unit 201 implements various functions by having a CPU (not shown) execute a control program that has been stored in a memory 205. The personal computer 101 further includes a short-range wireless communication unit 202 for performing short-range wireless communication 103, and a short-range wireless communication detection unit 203 for detecting that short-range wireless communication has become possible. When another device capable of communicating with the short-range wireless communication 103 enters a region within range of short-range wireless communication, the short-range wireless communication detection unit 203 usually detects that short-range wireless communication is possible. A display unit 204 presents a display. Ordinarily, in the case of a notebook personal computer, the display unit 204 is integrated with the body of the personal computer, but in the case of a desktop personal computer or the like, the display unit 204 is connected to the computer via a cable. It should be understood, therefore, that FIG. 2 is intended to also cover a configuration in a case where the display unit 204 is connected via a cable.

The PC control unit 201 executes an application by loading the application 210 in a memory 205. The PC control unit 201 further executes a control program stored in the memory 205 to thereby implement a short-range wireless communication control unit 206, a print instruction/control unit 207, an image data generation unit 208 and an image data transmission unit 209. The short-range wireless communication control unit 206 controls the short-range wireless communication unit 202. The print instruction/control unit 207 selects an application 210 displaying a document to be printed and issues a print instruction. The image generation unit 208 converts the document being displayed to a printable format. The image data transmission unit 209 sends the printer 102 the image data that has been generated by the image data generation unit 208. It should be noted that 210-1 to 210-*n* in FIG. 2 denote applications 1 to n that have been loaded in memory 205. A storage medium 211 is constituted by, e.g., a hard disk or flash memory and stores documents 1 to m as indicated at 212-1 to 212-*m*. The PC control unit 201 is connected to a keyboard 213 and mouse 214 and accepts instructions from the user via the keyboard and mouse.

Figure 3:
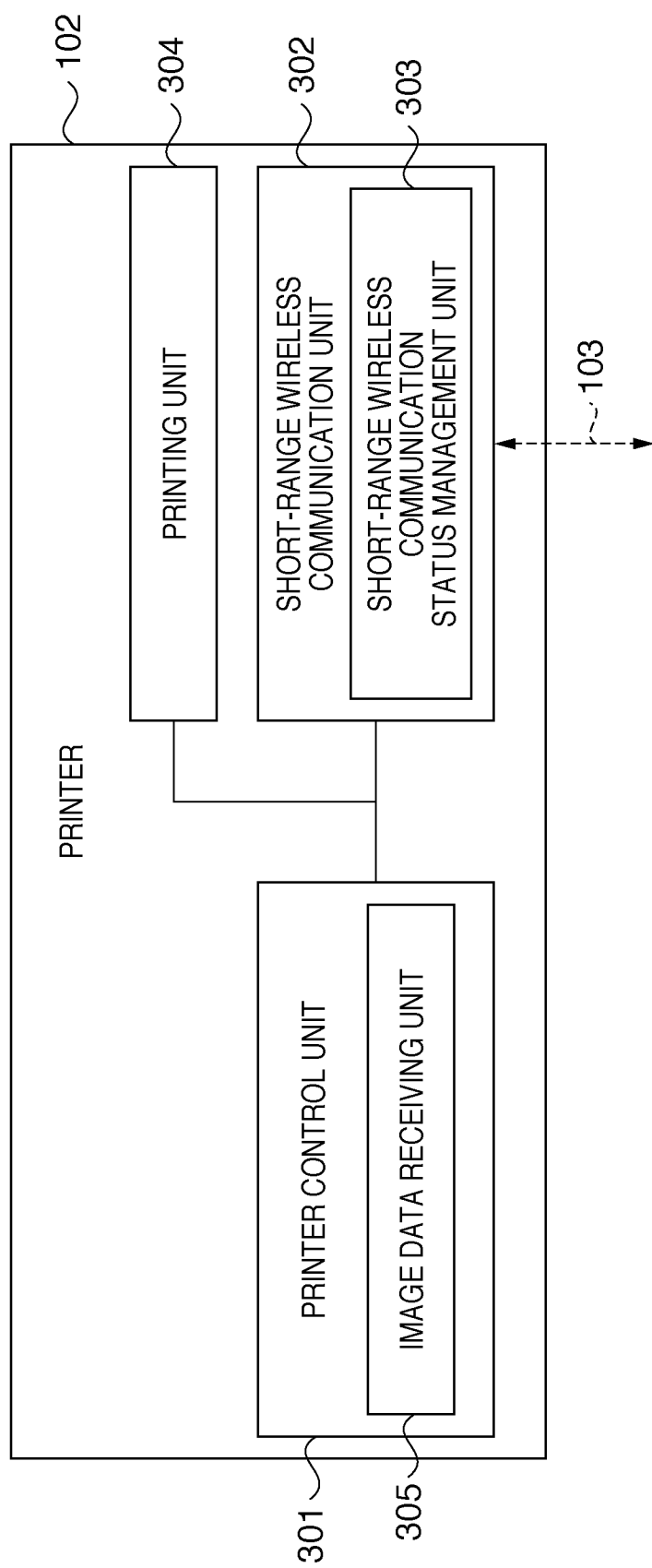
FIG. 3 is a block diagram illustrating an example of the configuration of a printer 102 according to the first embodiment.

FIG. 3 is a block diagram illustrating an example of the configuration of the printer 102 according to the first embodiment.

A printer control unit 301 controls the printer 102. A short-range wireless communication unit 302 communicates with the short-range wireless communication 103, and a short-range wireless communication status management unit 303 manages status as to whether or not short-range wireless communication is possible. A printing unit 304 performs printing on a printing medium such as paper by a prescribed printing method (ink-jet printing, electrophotographic printing, etc.). An image data receiving unit 305 receives image data from the personal computer 101.

Figure 4:
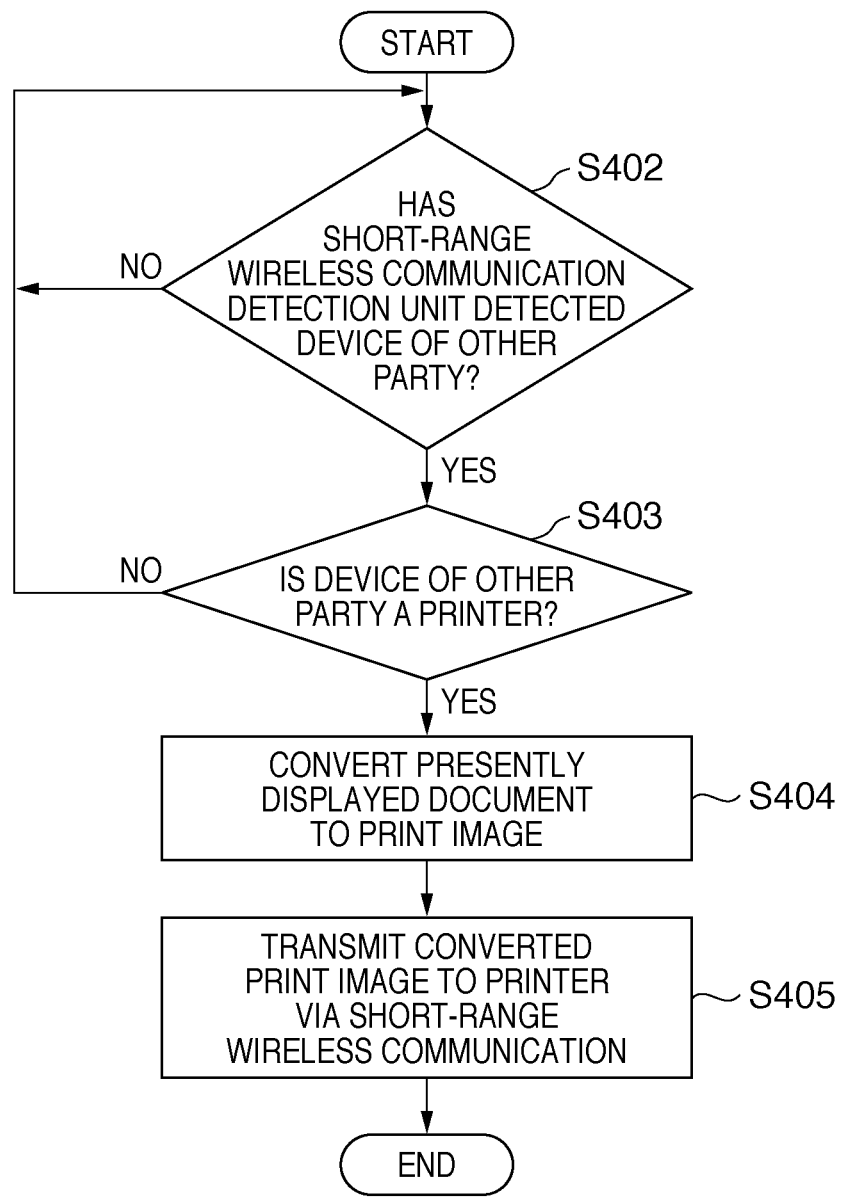
FIG. 4 is a flowchart illustrating operation of the personal computer 101 in the first embodiment.

Next, print processing by the wireless printing system of this embodiment described above in conjunction with FIGS. 1 to 3 will be described with reference to the flowchart of FIG. 4, which is a flowchart illustrating operation of the personal computer 101 in the first embodiment of the present invention.

In a case where the personal computer 101 edits or displays a document, drawing or image, etc., an application corresponding to document editing, rendering, spreadsheet, image editing or presentation is launched. In this specification, the term "document" will be used as the generic term for all documents, drawings and images (inclusive of thumbnails) hereafter. An ordinary personal computer is capable of editing a plurality of documents and of displaying a plurality of documents on the display unit 204 simultaneously.

Figure 5:
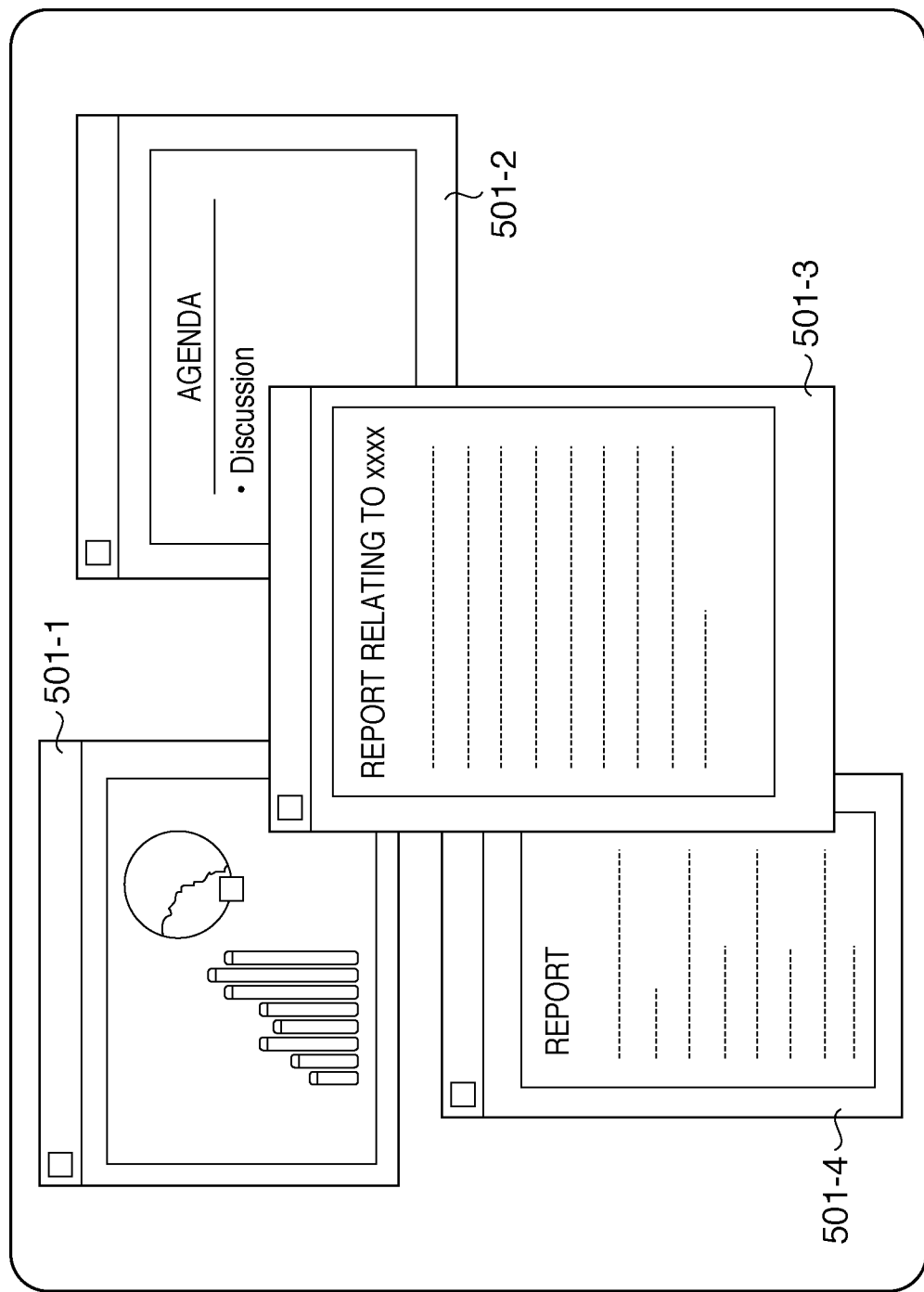
FIG. 5 is a diagram illustrating the manner in which a plurality of documents are displayed on a display unit 204.

FIG. 5 is a diagram illustrating the manner in which a plurality of documents are displayed on the display unit 204. In this example, a plurality of windows are displayed and a document is being displayed in each window. A display image 501-1 of document 212-1 has been opened by, e.g., a spreadsheet application. A display image 501-2 of a document 212-2 has been opened by, e.g., a presentation application. A display image 501-3 of a document 212-3 has been opened by, e.g., a document editing application. A display image 501-4 of a document 212-4 has been opened by, e.g., a document editing application that same as that used for the document 212-3. Among the documents 212-1 to 212-4 being displayed, the document that is presently the target of an operation by the keyboard 213 and mouse 214 is the document 212-3. The target document usually is displayed as the topmost document. Hereafter the document that is the target of operation will be referred to as a "prioritized document", and the application displaying the prioritized document will be referred to as a "prioritized application".

In FIG. 1, the user of the personal computer 101 brings the personal computer 101 close to the printer 102 in order to print a document being displayed on the display unit 204 of the personal computer 101. Bringing the personal computer 101 close to the printer 102 makes short-range wireless communication 103 possible. At this time the short-range wireless communication detection unit 203 detects that short-range wireless communication 103 has become possible (step S402) and so notifies the short-range wireless communication control unit 206 of PC control unit 201.

Upon detecting that short-range wireless communication has become possible, the short-range wireless communication control unit 206 of PC control unit 201 confirms via short-range wireless communication 103 whether the device that is the other party to short-range wireless communication is the printer 102 (step S403). This confirmation as to whether the device of the other party is the printer 102 is made by acquiring an identifier (or device number) from the printer via short-range wireless communication.

If it is confirmed that the device of the other party is the printer 102, then the print instruction/control unit 207 communicates a print instruction to the prioritized application that is displaying the prioritized document on the display unit 204. Upon receiving the print instruction, the prioritized application uses the image data generation unit 208 to convert the document to print-image data (print data) printable by the printer 102 (step S404).

The image data transmission unit 209 transmits the image data converted at step S404 to the printer 102 via short-range wireless communication 103 formed by the short-range wireless communication unit 202 (step S405).

The printer 102 receives the image data, which has been sent from the personal computer 101 via short-range wireless communication 103, at the image data receiving unit 305 and sends the image data to the printing unit 304, whereby the received image data is printed.

By implementing the first embodiment as described above, the document being edited or displayed is printed merely by bringing the personal computer 101 close to the printer 102. This has the effect of eliminating labor involved in a printing operation.

It should be noted that the methods set forth below are available as methods of notifying the application 210 of the print instruction in a case where the PC control unit 201 has confirmed that the device of the other party is the printer 102 in the first embodiment.

A first method is to communicate the print instruction solely to the prioritized application that is displaying the prioritized document on its own display unit, as described above. With the first method, one document is printed even in a case where a plurality of documents are being displayed. In FIG. 5, only document 501-3 is printed. That is, the prioritized application prints only the prioritized document even in a case where a plurality of documents are being displayed on the display unit. By implementing the first method, labor involved in performing a document-selection operation and printing operation for the purpose of printing a document is eliminated even in a case where a plurality of documents are being displayed on the personal computer 101.

A second method is to communicate the print instruction to all applications displaying documents on the display unit. With the second method, all documents being displayed are printed. In FIG. 5, documents 501-1, 501-2, 501-3 and 501-4 are printed.

By implementing the second method, if a plurality of documents are being displayed on the personal computer 101, then all of these documents will be printed. As a result, the labor involved in performing a document-selection operation and printing operation for every application displaying a document is eliminated.

It may be so arranged that which of the first and second methods is to be used is selected in advance. Furthermore, in the first embodiment, only the page being displayed in a document targeted for printing may be adopted at the target of printing, or all pages of this document may be targeted for printing. Further, it may be so arranged that whether the print target is made only the page being displayed or all pages is selected in advance. Further, "documents being displayed" on the display unit (display screen) may be construed to include or not to include documents whose display is hidden owing to window minimization, and which of these options is adopted may be made selectable. Further, in a case where a thumbnail is being displayed on the display unit, the image associated with this thumbnail may be adopted as the target of printing.

It should be noted that although the arrangement is such that the application generates the print image at step S404, this does not impose any limitation. For example, generation of a print image by cooperation between an application and a print library and generation of a print image by an operating system, etc., is conceivable. More specifically, the following examples can be mentioned:

(1) An image-data print library generates the print image in response to being called by the application.

(2) An image-data print library is incorporated within the application and the application generates the print image.

(3) The application posts a print job in an image-data print job, whereby the "print job" generates the print image.

(4) The control unit (operating system) generates the print image without any intervention by the application.

(5) The print image is generated not by each individual application but under the centralized control of "another application".

Figure 6:
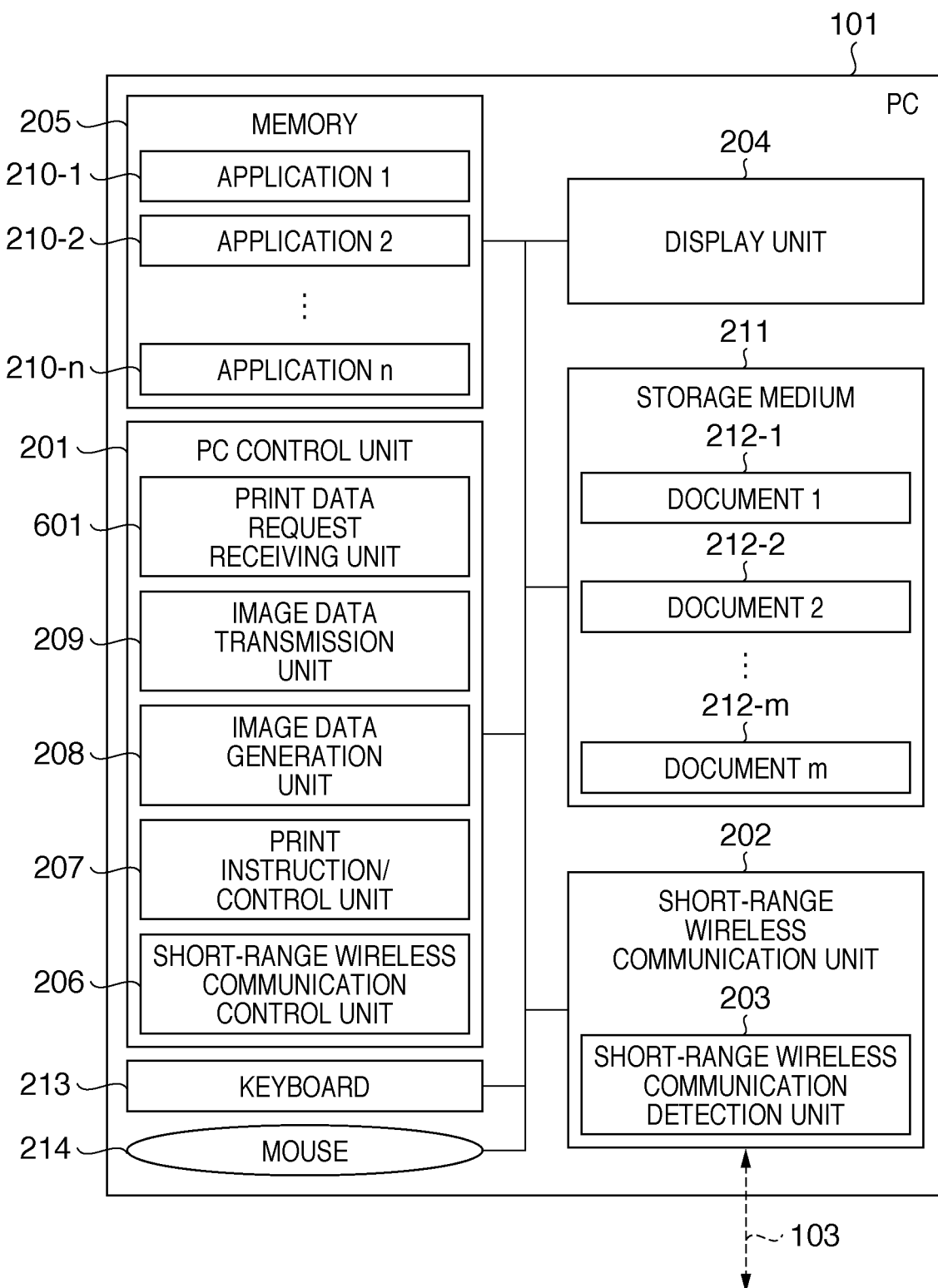
FIG. 6 is a block diagram illustrating an example of the configuration of the personal computer 101 according to a second embodiment.

FIG. 6 is a block diagram illustrating an example of the configuration of the personal computer 101 serving as an information processing apparatus in a second embodiment. Components of the personal computer in the second embodiment similar to those of the personal computer in the first embodiment (FIG. 2) are designated by like reference characters. In the personal computer 101 of the second embodiment, the PC control unit 201 is additionally provided with a print data request receiving unit 601. The print data request receiving unit 601 receives a print data request from the printer 102.

Figure 7:
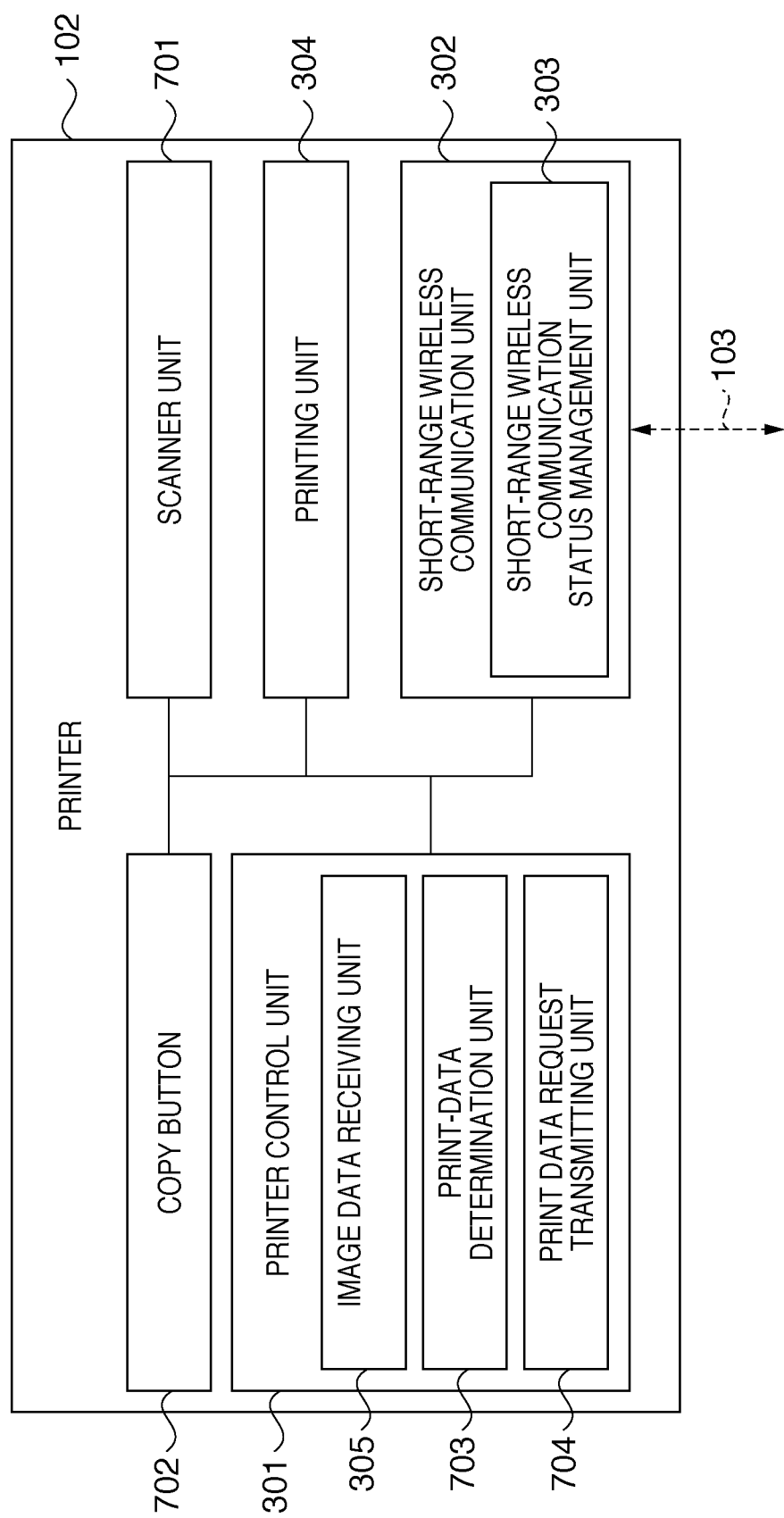
FIG. 7 is a block diagram illustrating an example of the configuration of the printer 102 according to the second embodiment.

FIG. 7 is a block diagram of the printer 102 serving as a printing apparatus in the second embodiment of the present invention. Components of the printer in the second embodiment similar to those of the printer in the first embodiment (FIG. 3) are designated by like reference characters.

A scanner unit (image reader) 701 reads a paper document optically and converts the document to image data. A copy button 702 is for applying to the printer 102 a print instruction operation for reading a document by the scanner unit 701 and printing the document. On the basis of the status of the short-range wireless communication status management unit 303, a print-data determination unit 703 decides the print target in a case where the copy button 702 is pressed. More specifically, depending upon whether short-range wireless communication is possible or not, the print-data determination unit 703 decides that the print target in the case where the copy button 702 has been pressed is either a document obtained by being read by the scanner unit 701 or a document obtained via short-range wireless communication.

Figure 8:
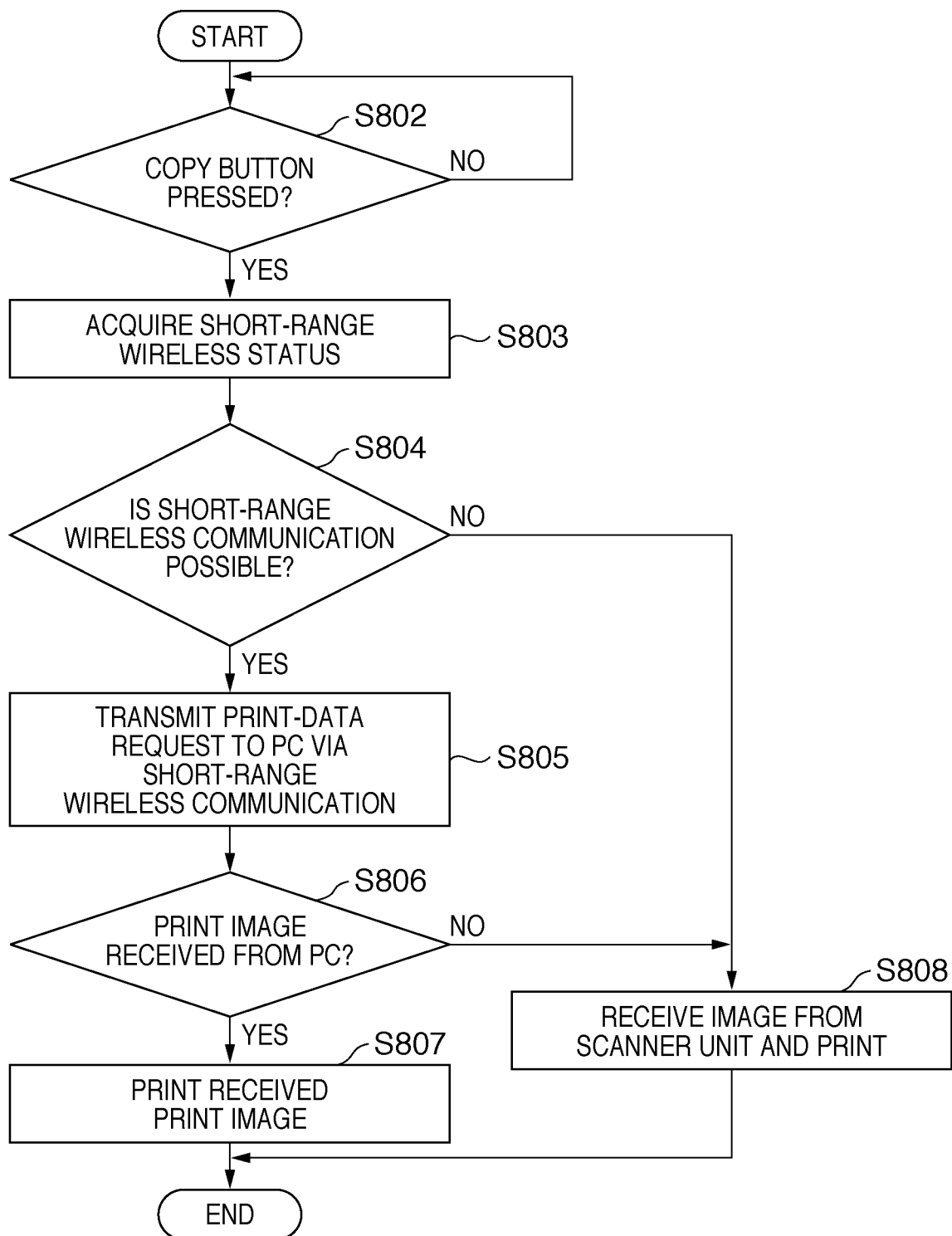
FIG. 8 is a flowchart illustrating operation of the printer 102 in the second embodiment.

FIG. 8 is a flowchart illustrating operation of the printer 102 in the second embodiment. FIG. 9 is a flowchart illustrating operation of the personal computer 101 in the second embodiment. Print processing in the wireless printing system of the second embodiment will be described with reference to FIG. 1 showing the configuration of the wireless printing system and to the block diagrams of FIGS. 6 and 7 and flowcharts of FIGS. 8 and 9.

As in the first embodiment, the personal computer 101 edits and displays documents, diagrams and images, etc. Accordingly, it will be assumed that the circumstances in which the plurality of documents are being displayed on the display unit 204 are as shown in FIG. 5.

In FIG. 1, the user of the personal computer 101 brings the personal computer 101 close to the printer 102 in order to print a document being displayed on the display unit 204 of the personal computer 101. Bringing the personal computer 101 close to the printer 102 makes short-range wireless communication 103 possible. In the second embodiment, however, printing is not carried out merely by the operation of bringing the personal computer 101 close to the printer 102 as illustrated in the first embodiment. In order to perform printing, it is also required that the user of the printer 102 press the copy button 702.

In the printer 102, the short-range wireless communication status management unit 303 monitors the status of short-range wireless communication 103 and holds the prevailing state, namely whether short-range wireless communication 103 is possible or not (i.e., whether short-range wireless communication has been established). Further, the printer control unit 301 monitors input from the copy button 702 (step S802). If the printer control unit 301 detects that the copy button 702 has been pressed by the user, then it acquires the short-range wireless state from the short-range wireless communication status management unit 303 (step S803). The print-data determination unit 703 decides the printing operation based upon the short-range wireless state acquired (step S804). That is, if short-range wireless communication 103 is not possible, the document is read by the scanner unit 701, converted to image data and printed by the printing unit 304 (step S808). If short-range wireless communication 103 is possible, on the other hand, then a print data request transmitting unit 704 transmits a print-data request to the personal computer 101 via short-range wireless communication 103 (step S805).

The personal computer 101 performs the operation described below in a case where it has received a print-data request from the printer 102 via short-range wireless communication 103.

The print data request receiving unit 601 performs monitoring to determine whether the short-range wireless communication unit 202 has received a print-data request via short-range wireless communication 103 (step S902). If it is detected that the print-data request has been received by the short-range wireless communication unit 202, then the print instruction/control unit 207 communicates a print instruction to the application 210 (e.g., the prioritized application) that is presenting a display on the display unit 204. Upon receiving this print instruction, the application 210 uses the image data generation unit 208 to convert the corresponding document to image data that is printable by the printer 102 (step S404).

The image data transmission unit 209 transmits the image data converted at step S404 to the printer 102 via short-range wireless communication 103 (step S405).

Using the short-range wireless communication unit 302, the image data receiving unit 305 in printer 102 receives the image data transmitted from the personal computer 101 via short-range wireless communication 103. The image data receiving unit 305 then sends the received image data to the printing unit 304, whereby the image data is printed (steps S806, S807).

In accordance with the second embodiment, a document being edited or displayed on the personal computer 101 is printed by an operation performed on the side of the printer 102. This enables a printing operation to be performed by the user at the location of the printer.

In a manner similar to that of the first embodiments, the above-described first and second methods are available also in the second embodiment as methods of notifying the application 210 of the print instruction in a case where the personal computer 101 has received a print-data request from the printer 102. Further, it may be so arranged that the first and second methods are made selectable. With regard to a document that has been selected, whether the print target is made only the page being displayed or all pages can be made selectable, as described in the first embodiment.

Thus, as set forth above, it is possible to cause a printing apparatus to print, through a simple operation, a document possessed by an information processing apparatus. For example, merely by bringing an information processing apparatus such as a personal computer close to a printer, a document being displayed can be printed. This makes it possible to greatly simply the labor involved in performing a printing operation.

The present invention is also achievable in embodiments such as a system, an apparatus, a method, a program, or a storage medium. Specifically, it may also be applied to a system constituted by multiple devices and may also be applied to an apparatus constituted by a single device.

Note that the case where the functionality of the above-mentioned embodiment is achieved by directly or remotely supplying a software program to a system or device and reading out and executing the supplied program code through a computer in the system or device is included in the scope of the present invention. In this case, the supplied program is a computer program that corresponds to the flowchart indicated in the drawings in the embodiment.

Accordingly, the program code itself, installed in a computer so as to realize the functional processing of the present invention through a computer, also realizes the present invention. In other words, the computer program itself, for realizing the functional processing of the present invention, is also included within the scope of the present invention.

In this case, object code, a program executed through an interpreter, script data supplied to an OS, or the like may be used, as long as it has the functions of the program.

Examples of the a computer readable storage medium that can be used to supply the computer program include Floppy® disks, hard disks, optical disks, magneto-optical disks, MOs, CD-ROMs, CD-Rs, CD-RWs, magnetic tape, non-volatile memory cards, ROMs, and DVDs (DVD-ROMs, DVD-Rs).

Using a browser of a client computer to connect to an Internet homepage and downloading the computer program of the present invention to a storage medium such as a hard disk can be given as another method for supplying the program. In this case, the downloaded program may be a compressed file including a function for automatic installation. Furthermore, this method may be realized by dividing the program code that makes up the program of the present invention into a plurality of files and downloading each file from different homepages. In other words, a WWW server that allows a plurality of users to download the program files for realizing the functional processing of the present invention through a computer also falls within the scope of the present invention.

Furthermore, the program of the present invention may be encrypted, stored in a storage medium such as a CD-ROM, and distributed to users. In this case, a user that has cleared a predetermined condition is allowed to download key information for removing the cryptography from a homepage via the Internet, use the key information to decrypt the program, and install the program on a computer.

Also, the functions of the present embodiment may be realized, in addition to through the execution of a loaded program using a computer, through cooperation with an OS or the like running on the computer based on instructions of the program. In this case, the OS or the like performs part or all of the actual processing, and the functions of the above-described embodiment are realized by that processing.

Furthermore, part or all of the functionality of the aforementioned embodiment may be written into a memory provided in a function expansion board installed in the computer, a function expansion unit connected to the computer, or the like, into which the program read out from the storage medium is written. In this case, after the program has been written into the function expansion board or the function expansion unit, a CPU or the like included in the function expansion board or the function expansion unit performs part or all of the actual processing based on the instructions of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-097480, filed Apr. 3, 2008, which is hereby incorporated by reference herein in its entirety.

The invention claimed is:

1. A printing apparatus comprising:
a housing, wherein a paper document that is to be optically read by a scanner is placed on a first part of the housing,
a cover that can be opened and closed, wherein the paper document placed on the first part of the housing is covered by the cover when the cover is closed,
one or more processors; and
one or more memories including instructions that, when executed by the one or more processors, cause the apparatus to:
determine whether or not a predetermined instruction from a user that is issued by operating a predetermined button of the printing apparatus has been accepted;
establish a wireless connection with an information processing apparatus, the wireless connection being compliant with NFC (Near Field Communication);
receive, in response to the wireless connection being established, print data for printing an image from the information processing apparatus, wherein, when a plurality of images is to be printed, print data for printing each of the plurality of images is received from the information processing apparatus without requiring user operations after the wireless connection is established, wherein the print data for the images is generated by the information processing apparatus by an application that is executed in the information processing apparatus and is capable of editing the image; and perform, based on the received print data, print processing of the one or more images, wherein the housing includes a second part toward which the information processing apparatus approximates to establish the wireless connection compliant with NFC, the second part being located at a position which is not covered by the cover even when the cover is closed, and wherein the wireless connection compliant with NFC is established to perform the print processing when the information processing apparatus approximates to the second part in a case where it is determined that the predetermined instruction from the user has been accepted, and the wireless connection compliant with NFC is not established to perform the print processing even when the information processing apparatus approximates to the second part in a case where it is determined that the predetermined instruction from the user has not been accepted.

2. The printing apparatus according to claim 1, wherein the printing apparatus transfers identification information of the printing apparatus to the information processing apparatus.

3. The printing apparatus according to claim 1, wherein the printing apparatus establishes the wireless connection with the information processing apparatus during a state in which the plurality of images are being selected for printing.

4. A method of operating a printing apparatus having a housing wherein a paper document that is to be optically read by a scanner is placed on a first part of the housing, and a cover that can be opened and closed, wherein the paper document placed on the first part of the housing is covered by the cover when the cover is closed, comprising the steps of:

determining whether or not a predetermined instruction from a user that is issued by operating a predetermined button of the printing apparatus has been accepted;

establishing a wireless connection with an information processing apparatus, the wireless connection being compliant with NFC (Near Field Communication);

receiving, in response to the wireless connection being established, print data for printing an image from the information processing apparatus, wherein, when a plurality of images is to be printed, print data for printing each of the plurality of images is received from the information processing apparatus without requiring user operations after the wireless connection is established, wherein the print data for the images is generated by the information processing apparatus by an application that is executed in the information processing apparatus and is capable of editing the image; and performing, based on the received print data, print processing of the one or more images, wherein the housing includes a second part toward which the information processing apparatus approximates to establish the wireless connection compliant with NFC, the second part being located at a position which is not covered by the cover even when the cover is closed, and wherein the wireless connection compliant with NFC is established to perform the print processing when the information processing apparatus approximates to the second part in a case where it is determined that the predetermined instruction from the user has been accepted, and the wireless connection compliant with NFC is not established to perform the print processing even when the information processing apparatus approximates to the second part in a case where it is determined that the predetermined instruction from the user has not been accepted.

5. A non-transitory computer readable storage medium storing a computer program causing a computer to execute a method of operating a printing apparatus having a housing, wherein a paper document that is to be optically read by a scanner is placed on a first part of the housing, and a cover that can be opened and closed, wherein the paper document placed on the first part of the housing is covered by the cover when the cover is closed, comprising the steps of:

determining whether or not a predetermined instruction from a user that is issued by operating a predetermined button of the printing apparatus has been accepted;

establishing a wireless connection with an information processing apparatus, the wireless connection being compliant with NFC (Near Field Communication);

receiving, in response to the wireless connection being established, print data for printing an image from the information processing apparatus, wherein, when a plurality of images is to be printed, print data for printing each of the plurality of images is received from the information processing apparatus without requiring user operations after the wireless connection is established, wherein the print data for the images is generated by the information processing apparatus by an application that is executed in the information processing apparatus and is capable of editing the image; and performing, based on the received print data, print processing of the one or more images, wherein the housing includes a second part toward which the information processing apparatus approximates to establish the wireless connection compliant with NFC, the second part being located at a position which is not covered by the cover even when the cover is closed, and wherein the wireless connection compliant with NFC is established to perform the print processing when the information processing apparatus approximates to the second part in a case where it is determined that the predetermined instruction from the user has been accepted, and the wireless connection compliant with NFC is not established to perform the print processing even when the information processing apparatus approximates to the second part in a case where it is determined that the predetermined instruction from the user has not been accepted.

6. A printing apparatus comprising:

a housing, wherein a paper document that is to be optically read by a scanner is placed on a first part of the housing, one or more processors; and one or more memories including instructions that, when executed by the one or more processors, cause the apparatus to:

establish a wireless connection with an information processing apparatus, the wireless connection being compliant with NFC (Near Field Communication);

determine whether or not a predetermined instruction from a user that is issued by operating a predetermined button of the printing apparatus has been accepted;

receive, in response to the wireless connection being established, print data for printing an image from the information processing apparatus, wherein, when a plurality of images is to be printed, print data for printing each of the plurality of images is received from the information processing apparatus without requiring user operations after the wireless connection is established, wherein the print data for the images is generated by the information processing apparatus by an application that is executed in the information processing apparatus and is capable of editing the image; and perform, based on the received print data, print processing of the one or more images, wherein the housing includes a second part toward which the information processing apparatus approximates to establish the wireless connection compliant with NFC, the second part being located at a position which is different from the first part, and wherein the wireless connection compliant with NFC is established to perform the print processing when the information processing apparatus approximates to the second part in a case where it is determined that the predetermined instruction from the user has been accepted, and the wireless connection compliant with NFC is not established to perform the print processing even when the information processing apparatus approximates to the second part in a case where it is determined that the predetermined instruction from the user has not been accepted.

7. A method of operating a printing apparatus having a housing wherein a paper document that is to be optically read by a scanner is placed on a first part of the housing, comprising the steps of:

determining whether or not a predetermined instruction from a user that is issued by operating a predetermined button of the printing apparatus has been accepted;

establishing a wireless connection with an information processing apparatus, the wireless connection being compliant with NFC (Near Field Communication);

receiving, in response to the wireless connection being established, print data for printing an image from the information processing apparatus, wherein, when a plurality of images is to be printed, print data for printing each of the plurality of images is received from the information processing apparatus without requiring user operations after the wireless connection is established, wherein the print data for the images is generated by the information processing apparatus by an application that is executed in the information processing apparatus and is capable of editing the image; and performing, based on the received print data, print processing of the one or more images, wherein the housing includes a second part toward which the information processing apparatus approximates to establish the wireless connection compliant with NFC, the second part being located at a position which is different from the first part, and wherein the wireless connection compliant with NFC is established to perform the print processing when the information processing apparatus approximates to the second part in a case where it is determined that the predetermined instruction from the user has been accepted, and the wireless connection compliant with NFC is not established to perform the print processing even when the information processing apparatus approximates to the second part in a case where it is determined that the predetermined instruction from the user has not been accepted.

8. A non-transitory computer readable storage medium storing a computer program causing a computer to execute a method of operating a printing apparatus having a housing, wherein a paper document that is to be optically read by a scanner is placed on a first part of the housing, comprising the steps of:

determining whether or not a predetermined instruction from a user that is issued by operating a predetermined button of the printing apparatus has been accepted;

establishing a wireless connection with an information processing apparatus, the wireless connection being compliant with NFC (Near Field Communication);

receiving, in response to the wireless connection being established, print data for printing an image from the information processing apparatus, wherein, when a plurality of images is to be printed, print data for printing each of the plurality of images is received from the information processing apparatus without requiring user operations after the wireless connection is established, wherein the print data for the images is generated by the information processing apparatus by an application that is executed in the information processing apparatus and is capable of editing the image; and performing, based on the received print data, print processing of the one or more images, wherein the housing includes a second part toward which the information processing apparatus approximates to establish the wireless connection compliant with NFC, the second part being located at a position which is different from the first part, and wherein the wireless connection compliant with NFC is established to perform the print processing when the information processing apparatus approximates to the second part in a case where it is determined that the predetermined instruction from the user has been accepted, and the wireless connection compliant with NFC is not established to perform the print processing even when the information processing apparatus approximates to the second part in a case where it is determined that the predetermined instruction from the user has not been accepted.

* * * * *